US011445543B2

(12) United States Patent
Park

(10) Patent No.: US 11,445,543 B2
(45) Date of Patent: Sep. 13, 2022

(54) METHOD AND APPARATUS FOR PERFORMING LISTEN BEFORE TALK (LBT) FOR WIRELESS COMMUNICATION IN UNLICENSED BAND

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/055,118

(22) PCT Filed: May 14, 2019

(86) PCT No.: PCT/KR2019/005551
§ 371 (c)(1),
(2) Date: Nov. 12, 2020

(87) PCT Pub. No.: WO2019/221443
PCT Pub. Date: Nov. 21, 2019

(65) Prior Publication Data
US 2021/0274549 A1  Sep. 2, 2021

(30) Foreign Application Priority Data

May 16, 2018 (KR) .......................... 10-2018-0056076
May 9, 2019 (KR) .......................... 10-2019-0054264

(51) Int. Cl.
*H04W 74/08* (2009.01)
*H04W 74/00* (2009.01)

(52) U.S. Cl.
CPC ..... *H04W 74/0808* (2013.01); *H04W 74/002* (2013.01); *H04W 74/0833* (2013.01)

(58) Field of Classification Search
CPC ............. H04W 74/002; H04W 74/006; H04W 74/0808; H04W 74/0833
See application file for complete search history.

(56) References Cited

U.S. PATENT DOCUMENTS

2017/0359808 A1* 12/2017 Dinan ............... H04W 72/1289
2018/0092043 A1*  3/2018 Yerramalli ............. H04L 5/005
(Continued)

FOREIGN PATENT DOCUMENTS

WO       2017/214621 A1   12/2017

OTHER PUBLICATIONS

Interdigital Inc., "On Frame Structure for NR-U Operation", R1-1804868, 3GPP TSG RAN WG1 Meeting #92bis Sanya, China, Apr. 16-20, 2018, pp. 1-5.
(Continued)

*Primary Examiner* — Kashif Siddiqui
(74) *Attorney, Agent, or Firm* — Invenstone Patent, LLC

(57) ABSTRACT

Provided are a method and apparatus for performing listen before talk (LBT) by a terminal for wireless communication in an unlicensed band. The method may include: determining an LBT scheme for transmitting an uplink signal in an unlicensed band, among a plurality of LBT schemes distinguished by at least one of whether to perform LBT, whether to perform random back off, and a random back-off time; and transmitting an uplink signal in an unlicensed band according to the determined LBT scheme.

6 Claims, 16 Drawing Sheets

(56) References Cited

U.S. PATENT DOCUMENTS

| | | | |
|---|---|---|---|
| 2018/0242232 A1* | 8/2018 | Chendamarai Kannan | ................. H04B 7/0695 |
| 2020/0021423 A1* | 1/2020 | Liu | ....................... H04L 1/1854 |
| 2021/0167900 A1* | 6/2021 | Karaki | .............. H04W 72/0446 |
| 2021/0274549 A1* | 9/2021 | Park | ................. H04W 74/0808 |

OTHER PUBLICATIONS

ZTE et al., "Discussion on frame structure and scheduling for NR-U", R1-1803949, 3GPP TSG RAN WG1 Meeting #92bis, Sanya, China, Apr. 16-20, 2018, pp. 1-5.

Sony, "Considerations on physical layer procedures for NR unlicensed operations", R1-1804597, 3GPP TSG RAN WG1 Meeting #92bis, Sanya, China, Apr. 16-20, 2018, pp. 1-4.

CATT, "Techniques for NR Unlicensed Operations", R1-1801762, 3GPP TSG RAN WG1 Meeting #92, Athens, Greece, Feb. 26-Mar. 2, 2018, pp. 1-3.

* cited by examiner

FIG.13

DL assignment DCI format

| ... | LBT indication information | ... |

UL grant DCI format

METHOD AND APPARATUS FOR PERFORMING LISTEN BEFORE TALK (LBT) FOR WIRELESS COMMUNICATION IN UNLICENSED BAND

CROSS REFERENCE TO RELATED APPLICATIONS

This application is a National Stage Patent Application of PCT International Patent Application No. PCT/KR2019/005551 (filed on May 14, 2019) under 35 U.S.C. § 371, which claims priority to Korean Patent Application Nos. 10-2018-0056076 (filed on May 16, 2018), and 10-2019-0054264 (filed on May 9, 2019), the teachings of which are incorporated herein in their entireties by reference.

TECHNICAL FIELD

The present disclosure relates to methods and apparatuses of performing Listen Before Talk ("LBT") for wirelessly communicating in an unlicensed band in next generation radio access network (hereinafter, referred to as "NR (New Radio)").

BACKGROUND ART

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from each other (e.g., subcarrier spacing, subframe, Transmission Time Interval (TTI), etc.) as a method for efficiently satisfying each usage scenario requirement through a frequency band constituting a NR system.

To address such an issue, there is a need for a design for enabling wireless communications to be performed over an unlicensed frequency band in the NR.

DETAILED DESCRIPTION OF THE INVENTION

Technical Problem

In accordance with embodiments of the present disclosure, provided are methods of determining an LBT scheme to be performed for transmitting an uplink ("UL") signal in an unlicensed band and enabling the UL signal to be transmitted in the unlicensed band according to the determined LBT scheme.

Technical Solution

In accordance with one aspect of the present disclosure, a method of a user equipment ("UE") is provided of performing LBT for wireless communications over an unlicensed band, the method comprising: determining an LBT scheme for transmitting an UL signal in the unlicensed band among a plurality of LBT schemes being distinct from one another according to at least one of whether the LBT is required to be performed, whether random-back-off is required to be performed, and a random-back-off time, and transmitting the UL signal over the unlicensed band according to the determined LBT scheme.

In accordance with another aspect of the present disclosure, a method of a base station is provided of performing LBT for wireless communications over an unlicensed band, the method comprising: transmitting a downlink ("DL") signal for indicating transmission of an UL signal in the unlicensed band, and receiving the UL signal over the unlicensed band according to a LBT scheme determined among a plurality of LBT schemes that is used for transmitting the UL signal over the unlicensed band and that is distinct from one another by at least one of whether the LBT is required to be performed, whether random-back-off is required to be performed, and a random-back-off time.

In accordance with further another aspect of the present disclosure, a UE is provided of performing LBT for wireless communications over an unlicensed band, the UE comprising: a controller determining an LBT scheme for transmitting an UL signal in the unlicensed band among a plurality of LBT schemes being distinct from one another by at least one of whether the LBT is required to be performed, whether random-back-off is required to be performed, and a random-back-off time, and a transmitter transmitting the UL signal over the unlicensed band according to the determined LBT scheme.

In accordance with yet another aspect of the present disclosure, a base station is provided of performing LBT for wireless communications over an unlicensed band, the base station comprising: a transmitter transmitting a downlink ("DL") signal for indicating transmission of an UL signal in the unlicensed band, and a receiver receiving the UL signal over the unlicensed band according to a LBT scheme determined among a plurality of LBT schemes that is used for transmitting the UL signal over the unlicensed band and that is distinct from one another by at least one of whether the LBT is required to be performed, whether random-back-off is required to be performed, and a random-back-off time.

Effects of the Invention

In accordance with embodiments of the present disclosure, it is possible to provide methods and apparatuses of performing LBT for wireless communications over an unlicensed band, by determining an LBT scheme to be performed for transmitting an uplink ("UL") signal in the unlicensed band, and enabling the UL signal to be transmitted in the unlicensed band according to the determined LBT scheme.

BRIEF DESCRIPTION OF THE DRAWINGS

The above and other aspects, features, and advantages of the present disclosure will be more apparent from the following detailed description taken in conjunction with the accompanying drawings, in which:

FIGS. 13 and 14 are diagrams for explaining a DCI format including LBT indication information in accordance with embodiments of the present disclosure;

BEST MODE FOR CARRYING OUT THE INVENTION

Figure 1:
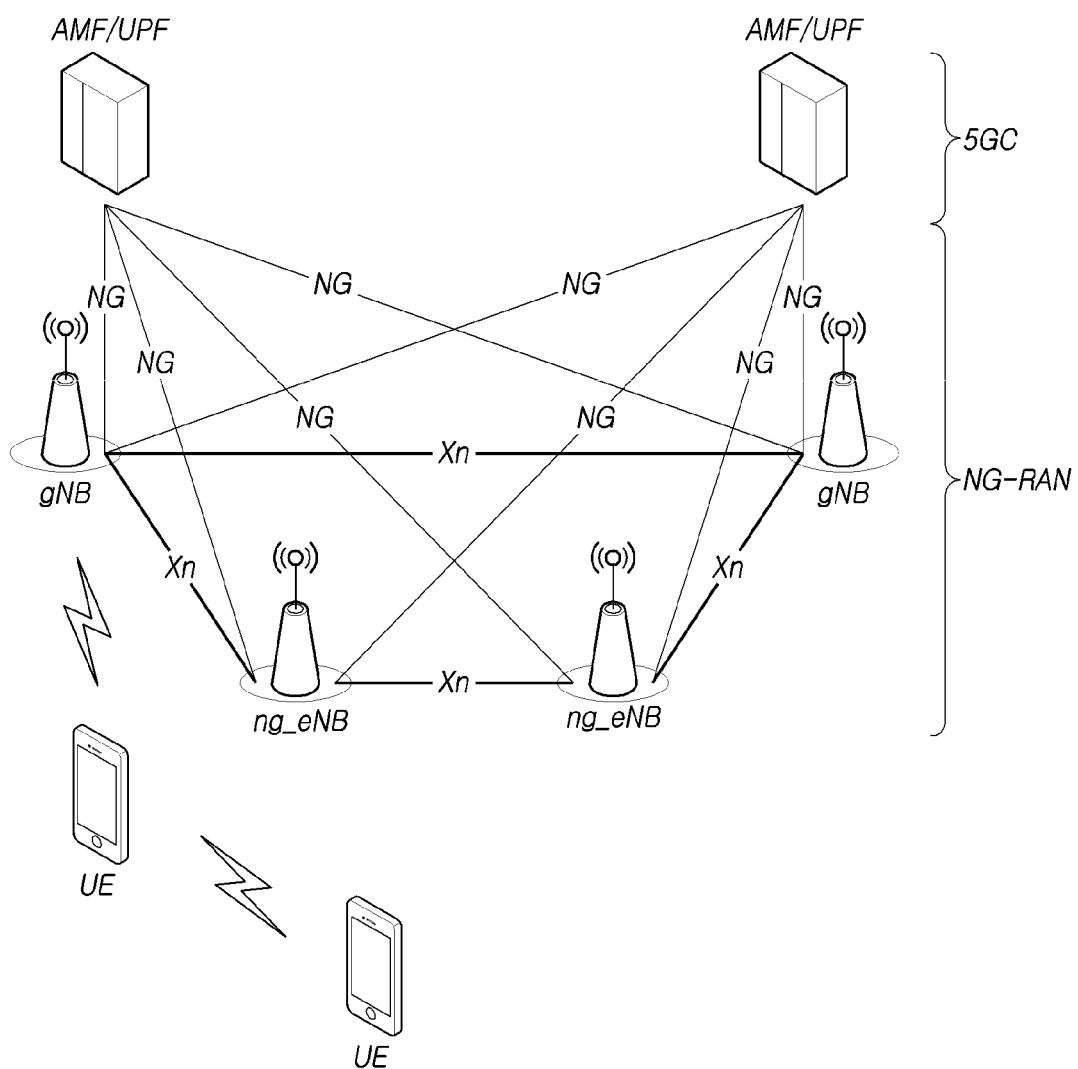
FIG. 1 schematically illustrates an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 schematically illustrates an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB.

However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
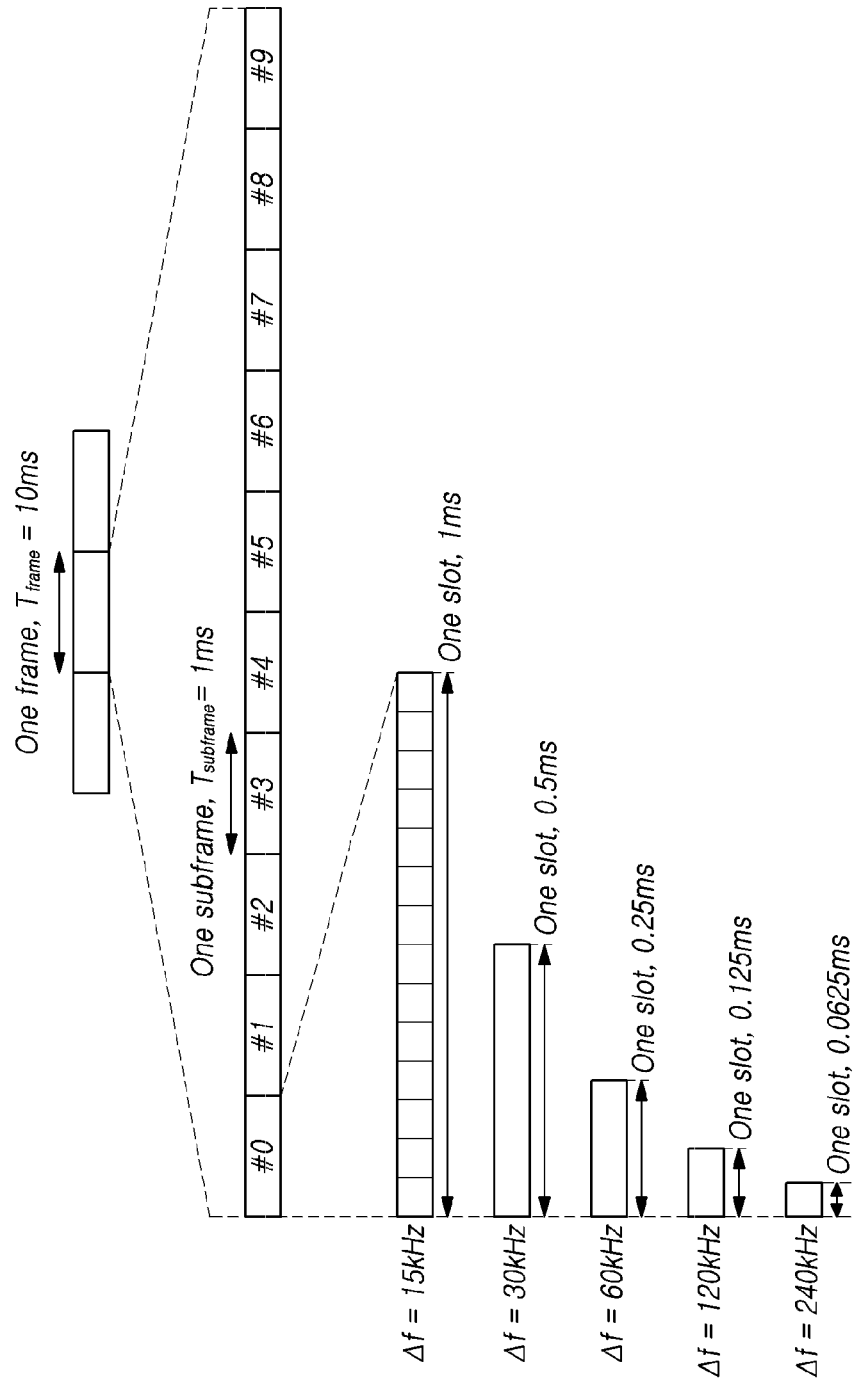
FIG. 2 schematically illustrates a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 illustrates a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
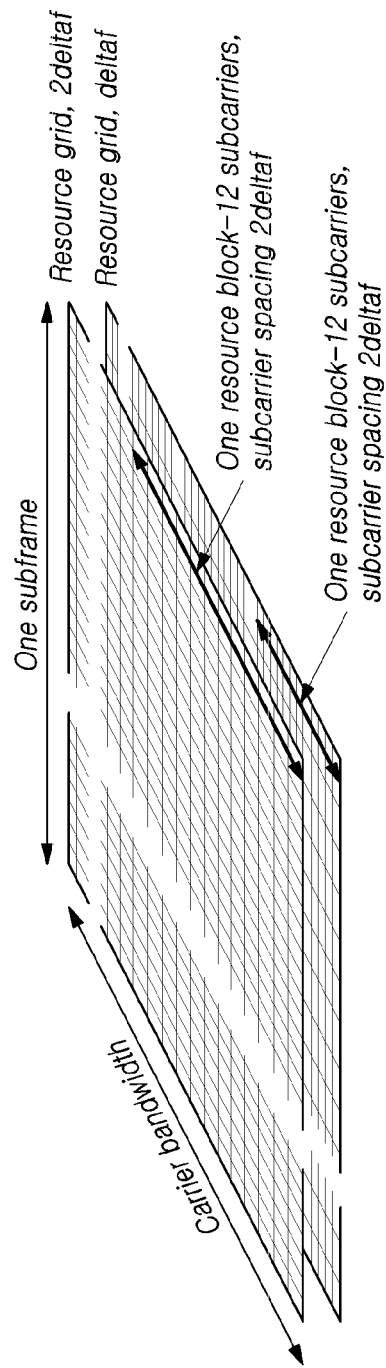
FIG. 3 illustrates resource grids supported by a radio access technology in accordance with embodiments of the present disclosure.

FIG. 3 is a view for explaining resource grids supported by a radio access technology.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
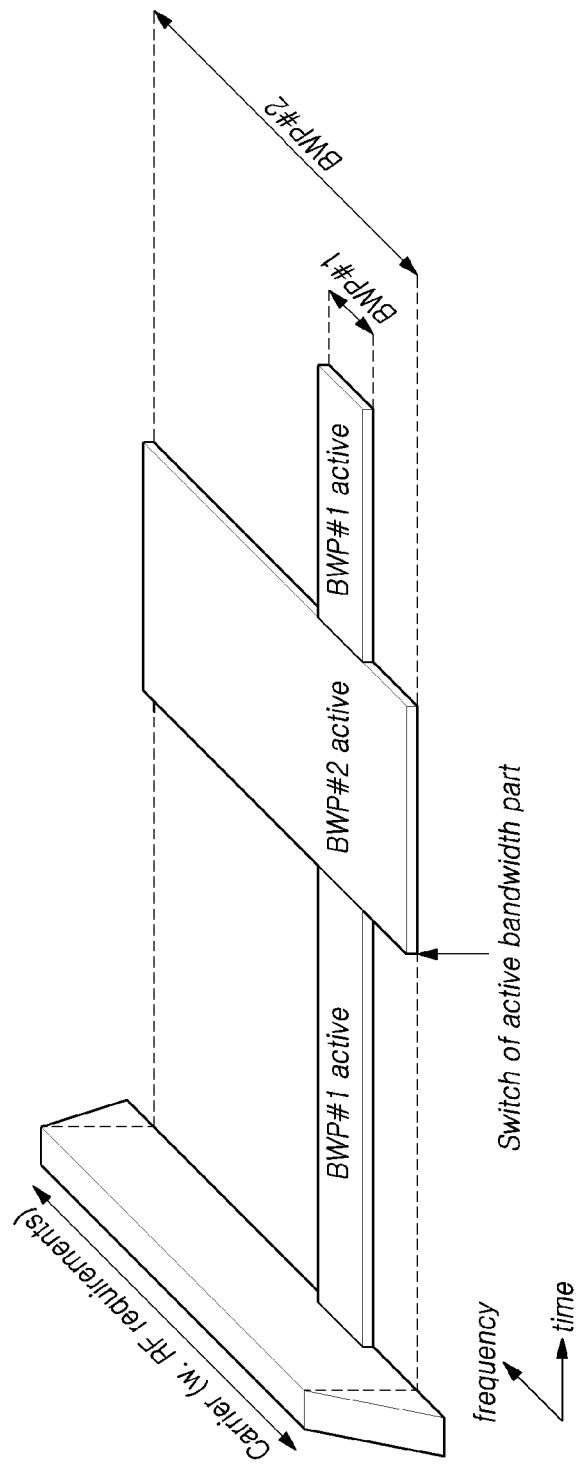
FIG. 4 illustrates bandwidth parts supported by a radio access technology in accordance with embodiments of the present disclosure.

FIG. 4 is a view for explaining bandwidth parts supported by a radio access technology.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
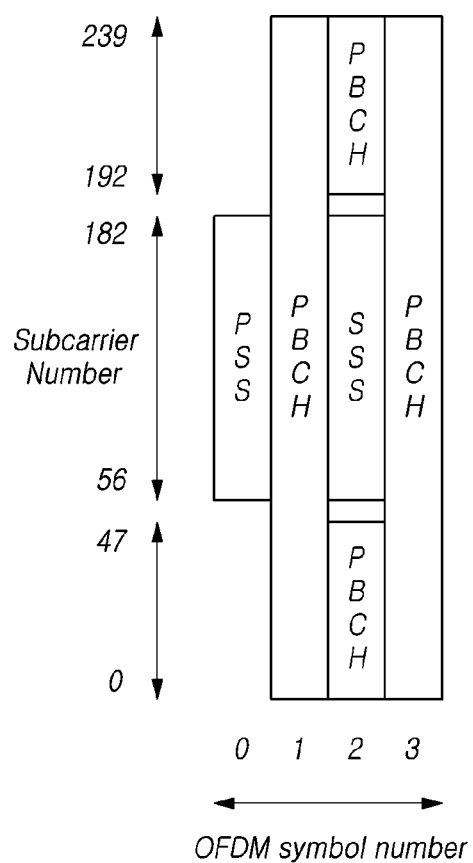
FIG. 5 illustrates an example of a synchronization signal block in a radio access technology in accordance with embodiments of the present disclosure.

FIG. 5 is a view illustrating an example of a synchronization signal block in a radio access technology.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
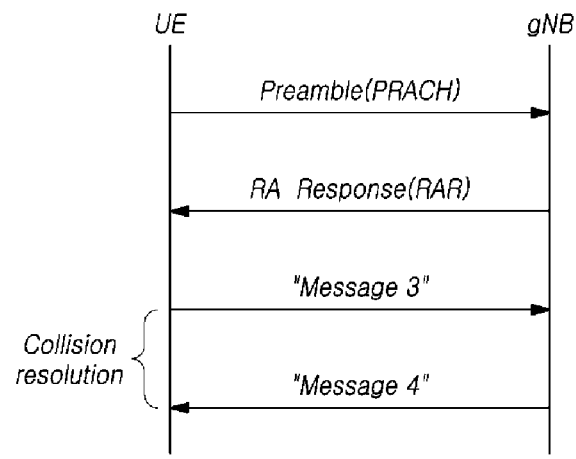
FIG. 6 is a signal diagram for explaining a random access procedure in a radio access technology in accordance with embodiments of the present disclosure.

FIG. 6 illustrates a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR Coreset>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
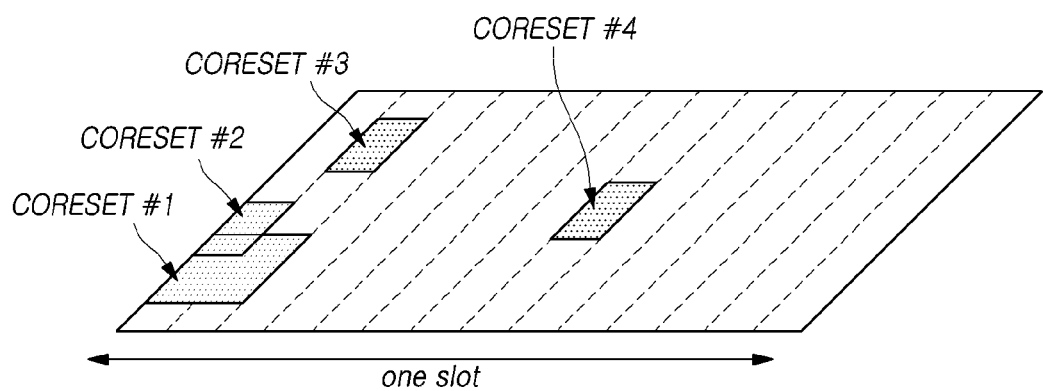
FIG. 7 illustrates CORESET.

FIG. 7 is a view for explaining CORESETs.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+an UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 8:
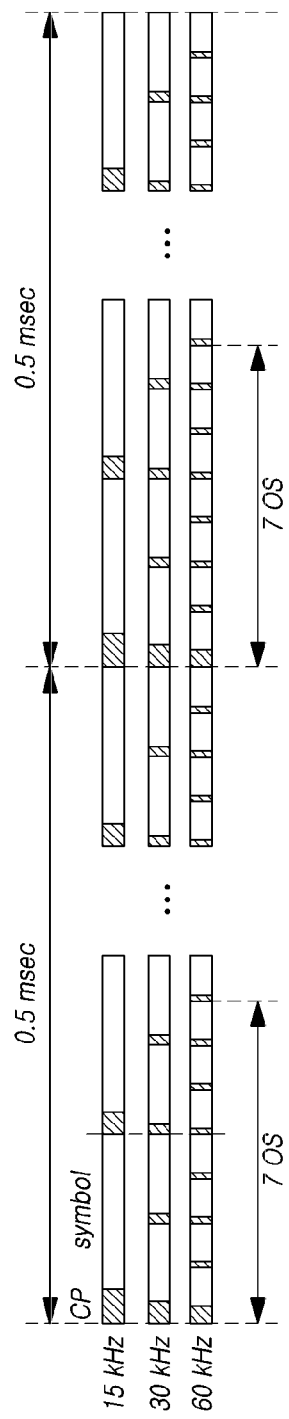
FIG. 8 illustrates an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

PDCCH

NR and LTE/LTE-A systems transmit and receive L1 control information, such as, DL assignment DL control information (DCI), UL grant DCI, and the like through a PDCCH. In NR, a control channel element (CCE) is defined as a resource unit for transmitting of the PDCCH, and a control resource set (CORESET) that is a frequency/time resource for the PDCCH transmission may be configured for each UE. Further, each CORESET may include one or more search spaces configured with one or more PDCCH candidates for allowing a UE to monitor the PDCCH. In NR, discussions on descriptions defined in 3GPP TS 38.211 and TS 38.213 among specifications related to the PDCCH are omitted for convenience of description. However, it is understood that these descriptions may be included within the scope of the present disclosure without departing from the spirit and scope of the described embodiments.

<Wider Bandwidth Operations>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 9:
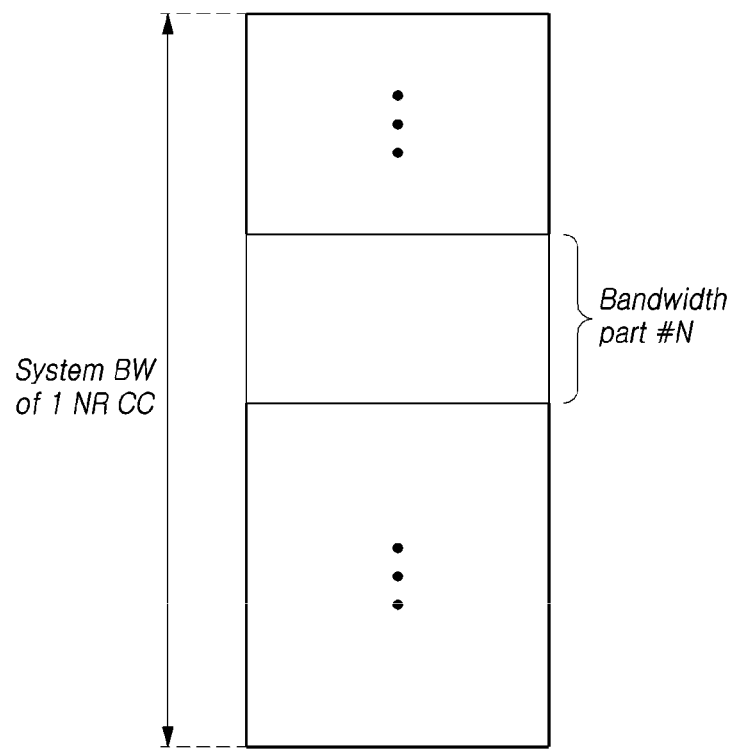
FIG. 9 schematically illustrates a bandwidth part in accordance with embodiments of the present disclosure.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

NR-U

Unlike licensed frequency bands, unlicensed frequency bands are radio channels not allowed an operator to occupy exclusively and are available to provide wireless communication services without an entity obtaining legal approval within regulations of each country. In order to provide NR services through an unlicensed band, it is necessary to solve a problem of coexistence with various short-range wireless communication protocols, such as WiFi, Bluetooth, NFC, and the like, which have been already provided over the unlicensed band, or a problem of coexistence between NR operators or LTE operators.

Therefore, when NR services are provided through an unlicensed band, to avoid interferences or collisions between wireless communication services, it is necessary to support a radio channel access scheme based on LBT of sensing a power level of a radio channel or a carrier to be used before transmitting a radio signal and then determining whether the radio channel or the carrier is available. In this case, since when a specific radio channel or a carrier in the unlicensed band is being used by another wireless communication protocol or another operator, there is a possibility that the providing of an NR service over the corresponding band may be hindered, it is therefore difficult for a wireless communication service over the unlicensed band to ensure QoS required by a user, unlike a wireless communication service over a licensed band.

In particular, unlike LTE that has supported unlicensed spectrum only through Carrier Aggregation ("CA") with licensed spectrum, in the case of NR-U, as a deployment scenario of the NR over an unlicensed band, since a stand-alone NR-U cell or an NR-U cell based on Dual Connectivity ("DC") with an NR cell or an LTE cell over a licensed band is considered, it is necessary to design a data transmission/reception method for enabling the unlicensed band itself to satisfy minimum QoS.

To do this, in accordance with embodiments of the present disclosure, a method is provided of performing LBT for wireless communications between a base station in an NR-U cell and a UE.

Hereinafter, methods of performing LBT for wireless communications over an unlicensed band will be described in detail with reference to accompanying drawings.

Figure 10:
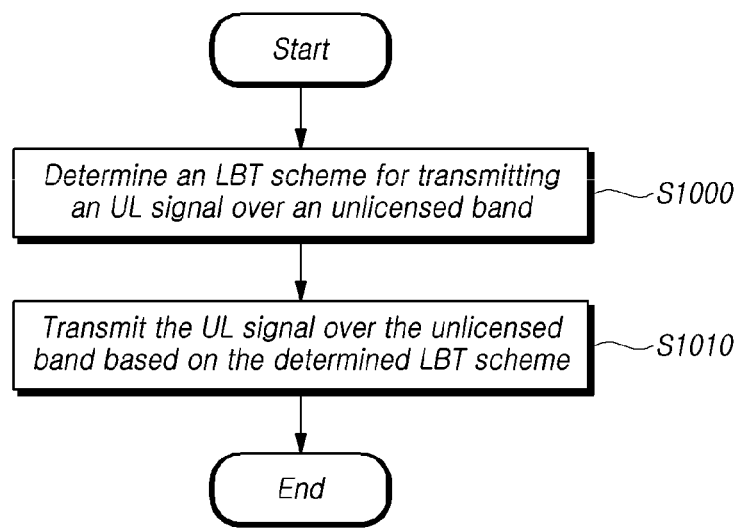
FIG. 10 is a flow diagram illustrating a procedure of a UE for performing LBT for wireless communications over an unlicensed band in accordance with embodiments of the present disclosure.

FIG. 10 is a flowchart illustrating a procedure of a UE for performing LBT for wireless communications over an unlicensed frequency band in accordance with embodiments of the present disclosure.

Referring to FIG. 10, a UE may determine an LBT scheme for transmitting an UL signal in an unlicensed band among a plurality of LBT schemes being distinct from one another by at least one of whether the LBT is required to be performed, whether random-back-off is required to be performed, and a random-back-off time, at step S1000.

In one embodiment, the UE may receive a DL channel or signal related to transmission of an UL signal or an UL channel in the unlicensed band from a base station. For example, the DL channel or signal related to the transmission of the UL signal or the UL channel may include a PDSCH to which the transmission of a PUCCH for HARQ feedback is indicated, DL assignment DCI to which the transmission of a PUCCH for CQI/CSI reporting is indicated, or UL grant DCI to which the transmission of a PUSCH is indicated, and the like.

As described above, to transmit a radio signal in the unlicensed band, it is necessary for LBT determining whether the unlicensed band to be used is available to be performed. For example, when a DL signal or channel associated with a DL transmission indicates the transmission of an UL signal or channel over an unlicensed band, the UE is required to preferentially perform LBT for the UL signal or channel transmission according to regulations on unlicensed spectrum, and then, it is determined whether the transmission of an UL signal or channel at an indicated time according to a result of the LBT is available. If it is determined that a corresponding radio channel has been occupied by another node based on the result of the LBT, that is, when an LBT failure occurs, there is a possibility that the corresponding UE cannot transmit the UL signal or channel at the indicated time.

In this case, when a transmission slot of the DL signal or channel including transmission indication information of the UL signal or channel and an associated transmission slot of the UL signal or channel are in a Channel Occupancy Time ("COT") of a corresponding base station, there is a possibility that the UE can transmit the UL signal or channel without performing the LBT. This is because the corresponding unlicensed band has already been occupied by the base station for the DL transmission for the UE; therefore not have been occupied by another node.

Based on the foregoing situations, in one embodiment, the LBT scheme may include a first LBT scheme in which LBT is not performed, a second LBT scheme in which random-back-off is not performed while LBT is performed, a third LBT scheme in which a random-back-off time interval is fixed while random-back-off is performed, and a fourth LBT scheme in which a random-back-off time interval is variable while random-back-off is performed.

In one embodiment, the LBT scheme may be determined when an UL signal or channel is transmitted in a channel occupancy time of a base station for an unlicensed band. For example, in a channel occupancy time of a base station, a suitable LBT scheme may be determined according to a timing gap between an DL signal or channel and an associated UL signal or channel, whether the transmission of an DL signal or channel and the transmission of an associated UL signal or channel is performed in an identical channel occupancy time, or the like.

In one embodiment, when a transmission resource for an UL signal or channel for a UE is assigned, the UE may receive information on an LBT scheme to be performed from a base station at a time of transmitting the UL signal or channel.

When the UE transmits a PUCCH or a PUSHC configured by the base station, the UE may receive information related to the LBT scheme for performing the LBT from the base station. In one embodiment, the LBT scheme may be distinct from one another by at least one of whether the LBT is required to be performed, whether random-back-off is required to be performed, and a random-back-off time. Here, the random-back-off may mean an operation of attempting the LBT again when an LBT failure occurs. Herein, a scheme of performing the LBT may be referred to as "LBT scheme"; however, embodiments of the present disclosure are not limited to such a specific term. For example, the scheme of performing the LBT may be variously referred to as an LBT category, or the like.

In one embodiment, the LBT scheme may include a first scheme in which LBT is not performed, a second scheme in which random-back-off is not performed while LBT is performed, a third scheme in which a random-back-off time interval is fixed while random-back-off is performed, and a fourth scheme in which a random-back-off time interval is variable while random-back-off is performed.

In one embodiment, a UE may directly receive, from a base station, an indication on whether LBT is required to be performed, or an LBT scheme, for an UL transmission of the UE through L1 control signaling. Specifically, an LBT indication information region for indicating whether the LBT is required to be performed or the LBT scheme may be included in a DL assignment DCI format for transmitting PDSCH scheduling control information.

For example, the LBT indication information may be indication information of 1 bit. In this case, when a UE transmits a PUCCH corresponding to the DL assignment DCI format, it may be determined whether the UE is required to perform the LBT according to values (0, 1) of the LBT indication information bit. That is, in this case, the corresponding bit values may mean distinguishing the first LBT scheme from the remaining LBT schemes, among the LBT schemes described above.

In another embodiment, the LBT indication information may be indication information of 2 bits. In this case, the first to fourth LBT schemes described above may be configured to correspond to respective values (00, 01, 10, 11) of the LBT indication information bit. When a UE transmits a PUCCH corresponding to a DL assignment DCI format, an LBT scheme to be used for performing the LBT by the UE may be determined according to values of the LBT indication information bit. That is, in this case, the respective bit values may mean distinguishing the first to fourth LBT schemes among the LBT schemes described above.

In this case, the PUCCH transmission corresponding to the DL assignment DCI format by the UE may be a PUCCH transmission for a HARQ feedback information transmission of the UE in response to a PDSCH reception of the UE based on the DL assignment DCI format. In another example, when CQI/CSI reporting is triggered by a DL assignment DCI format, a PUCCH transmission corresponding to the DL assignment DCI format by the UE may be an associated PUCCH transmission for the CQI/CSI reporting.

Likewise, an LBT indication information region may be included in an UL grant DCI format for transmitting PUSCH scheduling control information.

For example, the LBT indication information may be indication information of 1 bit. In this case, when a UE transmits a PUSCH corresponding to the UL grant DCI format, it may be determined whether the UE is required to perform the LBT according to values (0, 1) of the LBT indication information bit. That is, in this case, the corresponding bit values may mean distinguishing the first LBT scheme from the remaining LBT schemes, among the LBT schemes described above.

In another embodiment, the LBT indication information may be indication information of 2 bits. In this case, the first to fourth LBT schemes described above may be assigned to correspond to respective values (00, 01, 10, 11) of the LBT indication information bit. When a UE transmits a PUSCH corresponding to an UL grant DCI format, an LBT scheme to be used for performing the LBT by the UE may be determined according to values of the LBT indication information bit. That is, in this case, the respective bit values may mean distinguishing the first to fourth LBT schemes among the LBT schemes described above.

In this case, the PUSCH transmission corresponding to the DL grant DCI format by the UE may be a PUSCH transmission for an UL data transmission of the UE, or a PDSCH transmission for a UCI transmission of the UE.

Further, in one embodiment, when LBT indication information is transmitted through a DL assignment DCI format or an UL grant DCI format, a UE may receive, through higher layer signaling, whether a corresponding LBT indication information region is included in the DL assignment DCI format or the UL grant DCI format for a UE configured by a base station. In another embodiment, whether an LBT indication information is included in a DL assignment DCI format or an UL grant DCI format may be determined according to whether a cell type in which a UE performs an UL transmission corresponding to the DCI format is an NR-U cell, a licensed band NR cell, or the like.

In one embodiment, an LBT scheme of a UE for an unlicensed band may be determined according to a channel occupancy time value by a base station and a timing gap between a DL reception and an associated UL transmission.

As an example, a time-domain resource and a frequency-domain resource that are PUCCH resources for transmitting HARQ feedback may be indicated by a base station through DL assignment DCI. As another example, PUCCH resources for transmitting HARQ feedback may be semi-statically configured through RRC signaling. In particular, in the case of the time-domain resource, a timing gap, a K1 value, between a PDSCH reception slot and an associated HARQ feedback information transmission slot may be transmitted to a UE through DL assignment DCI or RRC signaling.

Further, likewise, a PUCCH resource for CQI/CSI reporting may be assigned through RRC signaling and DL assignment DCI. When CSI/CQI reporting through a PUCCH is indicated through DL assignment DCI, a timing gap value, an M value, between a slot on which the DL assignment DCI is transmitted and a slot on which a PUCCH transmission including associated CQI/CSI reporting information is performed may be transmitted to a UE through RRC signaling and DL assignment DCI.

Further, in a similar way to that of the PUCCH, for a PUSCH transmission of a UE, a timing gap value, a K2 value, between UL grant DCI transmitted by a base station and a slot on which an associated PUSCH transmission is performed may be semi-statically configured through RRC signaling by the base station or dynamically configured through UL grant DCI.

That is, when a PUCCH transmission is performed for HARQ feedback in response to a PDSCH reception, a timing gap between the PDSCH reception and the PUCCH transmission becomes K1 as described above. In this case, whether the LBT is required to be performed, or an LBT scheme, for a PUCCH transmission over an unlicensed band may be configured to be determined by the K1 value.

In another embodiment, when CQI/CSI reporting is triggered by DL assignment DCI, a timing gap between the DL assignment DCI and an associated PUCCH transmission becomes M as described above. In this case, whether the LBT is required to be performed, or an LBT scheme, for a PUCCH transmission for CQI/CSI reporting over an unlicensed band may be configured to be determined by the M value.

In another embodiment, in the case of an UL grant DCI format and an associated PUSCH transmission, a timing gap between the UL grant DCI and the associated PUSCH transmission becomes K2 as described above. In this case, whether the LBT is required to be performed, or an LBT scheme, for a PUSCH transmission over an unlicensed band may be configured to be determined by the K2 value.

In one embodiment, when the K1 value, the K2 value, or the M value is smaller than a threshold value, a corresponding UE may be configured to enable an indicated PUCCH or PUSCH transmission without performing the LBT. In another embodiment, when the K1 value, the K2 value, or the M value is larger than the threshold value, the UE may be configured to enable a corresponding PUCCH or PUSCH transmission after performing the LBT. In this case, the interval in which the K1 value, the K2 value, or the M value is larger than the threshold value may be classified and configured to correspond to each of the second to fourth LBT schemes.

In one embodiment, the threshold value served as a reference for determining an LBT scheme may be i) determined by a channel occupancy time value of a base station in a corresponding unlicensed band, ii) configured by the base station through cell-specific RRC signaling or UE-specific RRC signaling, or iii) configured by the base station through cell-specific RRC signaling or UE-specific RRC signaling irrespective of the channel occupancy time value.

In another embodiment, the threshold value served as a reference for determining an LBT scheme may be defined as a single threshold value for each UL transmission case described above, or be defined as different threshold values and configured by a base station through cell-specific RRC signaling or UE-specific RRC signaling. That is, an identical threshold value may be defined for the K1, the K2, and the M, or be configured by a base station through cell-specific RRC signaling or UE-specific RRC signaling. In another embodiment, separate threshold values may be defined for respective the K1, the K2, and the M, or be configured by a base station through cell-specific RRC signaling or UE-specific RRC signaling.

Hereinbefore, whether the LBT is required to be performed, or an LBT scheme, has been discussed based on an assumption that a PUSCH or PUCCH is transmitted. However, in another embodiment, the foregoing description may be substantially equally applicable even when a PRACH or SRS transmission is performed.

For example, even when a PRACH transmission of a UE is triggered by a system information block (SIB) or a PDCCH, LBT indication information may be directly transmitted through a corresponding SIB or PDCCH message, or the UE may be configured to determine whether the LBT is required to be performed, or an LBT scheme, based on a timing gap between a SIB or PDCCH reception slot and an associated PRACH transmission slot. Likewise, even when an SRS transmission is triggered through a PDCCH, the LBT indication information may be directly transmitted through the PDCCH, or the UE may be configured to determine whether to perform the LBT based on a timing gap between a PDCCH reception slot and an associated SRS transmission slot.

Referring back to FIG. 10, the UE may transmit the UL signal over the unlicensed band according to the determined LBT scheme, at step S1010.

The UE may perform the LBT for the unlicensed band to which the transmission of the UL signal or channel is indicated according to the determined LBT scheme. For example, if the determined LBT scheme is the first LBT scheme, the UE may perform the transmission of the indicated UL signal or channel without performing the LBT for the unlicensed band.

If the determined LBT scheme is any one of the second to fourth LBT schemes, the UE may perform the LBT for the unlicensed band according to the determined LBT scheme. That is, if the determined LBT scheme is the second LBT scheme, the UE may perform the LBT without performing a random-back-off operation. As another example, if the determined LBT scheme is the third LBT scheme, when an LBT failure occurs, the UE may perform a random-back-off operation according to a predetermined fixed time interval. As another example, if the determined LBT scheme is the fourth LBT scheme, when an LBT failure occurs, the UE may perform a random-back-off operation according to a variable time interval. When the unlicensed band is identified as not being occupied based on LBT performing, the UE may perform the transmission of the indicated UL signal or channel.

According to the embodiments described above, it is possible to provide methods and apparatuses of performing LBT for wireless communications over an unlicensed band, by determining an LBT scheme to be performed for transmitting an UL signal in the unlicensed band, and enabling the UL signal to be transmitted in the unlicensed band based on the determined LBT scheme.

Figure 11:
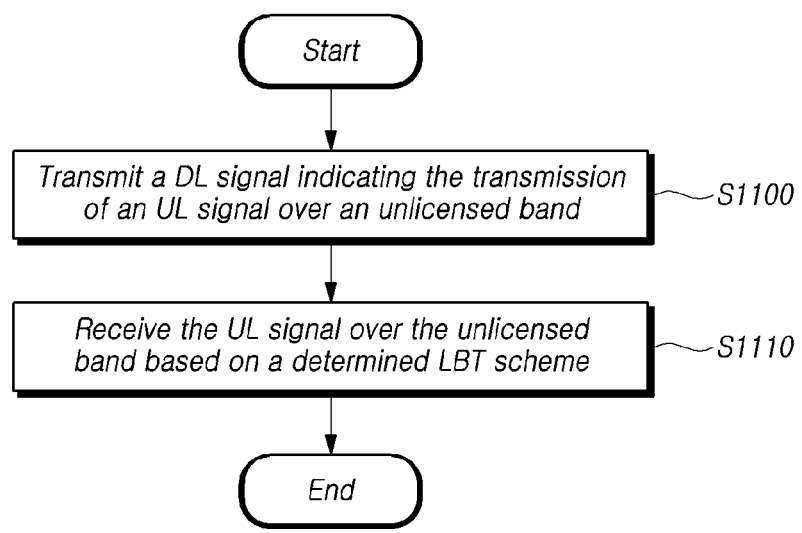
FIG. 11 is a flow diagram illustrating a procedure of a base station for performing LBT for wireless communications over an unlicensed band in accordance with embodiments of the present disclosure.

FIG. 11 is a flowchart illustrating a procedure of a base station for performing LBT for wireless communications over an unlicensed frequency band in accordance with embodiments of the present disclosure.

Referring to FIG. 11, the base station may transmit a DL signal indicating the transmission of an UL signal over the unlicensed band, at step S1100.

In one embodiment, the base station may transmit a DL channel or signal related to transmission of an UL signal or an UL channel in the unlicensed band to a UE. For example, the DL channel or signal related to the transmission of the UL signal or the UL channel may include a PDSCH to which the transmission of a PUCCH for HARQ feedback is indicated, DL assignment DCI to which the transmission of a PUCCH for CQI/CSI reporting is indicated, or UL grant DCI to which the transmission of a PUSCH is indicated, and the like.

Referring to FIG. 11, a UE may determine an LBT scheme for transmitting an UL signal in an unlicensed band among a plurality of LBT schemes that is used for transmitting the UL signal over the unlicensed band and that is distinct from one another by at least one of whether the LBT is required to be performed, whether random-back-off is required to be performed, and a random-back-off time, at step S1110.

In one embodiment, when a transmission resource for an UL signal or channel for any UE is assigned, the base station may transmit information on an LBT scheme to be performed to the UE at a time of transmitting the UL signal or channel.

When the base station transmits a PUCCH or a PUSHC, the base station may configure an LBT scheme for performing the LBT and indicate the configured LBT scheme to a UE. As described above, the LBT scheme may include a first scheme in which LBT is not performed, a second scheme in which random-back-off is not performed while LBT is performed, a third scheme in which a random-back-off time interval is fixed while random-back-off is performed, and a fourth scheme in which a random-back-off time interval is variable while random-back-off is performed.

In one embodiment, a base station may directly indicate, to a UE, whether LBT is required to be performed, or an LBT scheme, for an UL transmission of the UE through L1 control signaling. Specifically, an LBT indication information region for indicating whether the LBT is required to be performed or the LBT scheme may be included in a DL assignment DCI format for transmitting PDSCH scheduling control information.

In one embodiment, the LBT indication information may be indication information of 1 bit. In this case, when a UE transmits a PUCCH corresponding to the DL assignment DCI format, it may be determined whether the UE is required to perform the LBT according to values (0, 1) of the LBT indication information bit. That is, in this case, the corresponding bit values may mean distinguishing the first LBT scheme from the remaining LBT schemes, among the LBT schemes described above.

In another embodiment, the LBT indication information may be indication information of 2 bits. In this case, the first to fourth LBT schemes described above may be configured to correspond to respective values (00, 01, 10, 11) of the LBT indication information bit. When a UE transmits a PUCCH corresponding to a DL assignment DCI format, an LBT scheme to be used for performing the LBT by the UE may be determined according to values of the LBT indication information bit. That is, in this case, the respective bit values may mean distinguishing the first to fourth LBT schemes among the LBT schemes described above.

In this case, the PUCCH transmission corresponding to the DL assignment DCI format by the UE may be a PUCCH transmission for a HARQ feedback information transmission of the UE in response to a PDSCH reception of the UE based on the DL assignment DCI format. As another example, when CQI/CSI reporting is triggered by a DL assignment DCI format, a PUCCH transmission corresponding to the DL assignment DCI format by the UE may be an associated PUCCH transmission for the CQI/CSI reporting.

Likewise, an LBT indication information region may be included in an UL grant DCI format for transmitting PUSCH scheduling control information.

In one embodiment, the LBT indication information may be indication information of 1 bit. In this case, when a UE transmits a PUSCH corresponding to the UL grant DCI format, it may be determined whether the UE is required to perform the LBT according to values (0, 1) of the LBT indication information bit. That is, in this case, the corresponding bit values may mean distinguishing the first LBT scheme from the remaining LBT schemes, among the LBT schemes described above.

In another embodiment, the LBT indication information may be indication information of 2 bits. In this case, the first to fourth LBT schemes described above may be configured to correspond to respective values (00, 01, 10, 11) of the LBT indication information bit. When a UE transmits a PUSCH corresponding to an UL grant DCI format, an LBT scheme to be used for performing the LBT by the UE may be determined according to values of the LBT indication information bit. That is, in this case, the respective bit values may mean distinguishing the first to fourth LBT schemes among the LBT schemes described above.

In this case, the PUSCH transmission corresponding to the DL grant DCI format by the UE may be a PUSCH transmission for an UL data transmission of the UE, or a PDSCH transmission for a UCI transmission of the UE.

Further, in one embodiment, when LBT indication information is transmitted through a DL assignment DCI format or an UL grant DCI format, a base station may configure whether a corresponding LBT indication information region is included in the DL assignment DCI format or the UL grant DCI format for a UE and indicate through higher layer signaling. In another example, whether an LBT indication information is included in a DL assignment DCI format or an UL grant DCI format may be determined according to whether a cell type in which a UE performs an UL transmission corresponding to the DCI format is an NR-U cell, a licensed band NR cell, or the like.

In one embodiment, an LBT scheme of a UE for an unlicensed band may be determined according to a channel occupancy time value by a base station and a timing gap between a DL reception and an associated UL transmission.

For example, a time-domain resource and a frequency-domain resource that are PUCCH resources for transmitting HARQ feedback may be indicated by a base station through DL assignment DCI. As another example, PUCCH resources for transmitting HARQ feedback may be semi-statically configured through RRC signaling. In particular, in the case of the time-domain resource, a timing gap, a K1 value, between a PDSCH reception slot and an associated HARQ feedback information transmission slot may be transmitted to a UE through DL assignment DCI or RRC signaling.

Further, likewise, a PUCCH resource for CQI/CSI reporting may be assigned through RRC signaling and DL assignment DCI. When CSI/CQI reporting through a PUCCH is indicated through DL assignment DCI, a timing gap value, an M value, between a slot on which the DL assignment DCI is transmitted and a slot on which a PUCCH transmission including associated CQI/CSI reporting information is performed may be transmitted to a UE through RRC signaling and DL assignment DCI.

Further, in a similar way to that of the PUCCH, for a PUSCH transmission of a UE, a timing gap value, a K2 value, between UL grant DCI transmitted by a base station and a slot on which an associated PUSCH transmission is performed may be semi-statically configured through RRC signaling by the base station or dynamically configured through UL grant DCI.

That is, when a PUCCH transmission is performed for HARQ feedback in response to a PDSCH reception, a timing gap between the PDSCH reception and the PUCCH transmission becomes K1 as described above. In this case, whether the LBT is required to be performed, or an LBT scheme, for a PUCCH transmission over an unlicensed band may be configured to be determined by the K1 value.

As another example, when CQI/CSI reporting is triggered by DL assignment DCI, a timing gap between the DL assignment DCI and an associated PUCCH transmission becomes M as described above. In this case, whether the LBT is required to be performed, or an LBT scheme, for a PUCCH transmission for CQI/CSI reporting over an unlicensed band may be configured to be determined by the M value.

As another example, in the case of an UL grant DCI format and an associated PUSCH transmission, a timing gap between the UL grant DCI and the associated PUSCH transmission becomes K2 as described above. In this case, whether the LBT is required to be performed, or an LBT scheme, for a PUSCH transmission over an unlicensed band may be configured to be determined by the K2 value.

In one embodiment, when the K1 value, the K2 value, or the M value is smaller than a threshold value, a corresponding UE may be configured to enable an indicated PUCCH or PUSCH transmission without performing the LBT. In another embodiment, when the K1 value, the K2 value, or the M value is larger than the threshold value, the UE may be configured to enable a corresponding PUCCH or PUSCH transmission after performing the LBT. In this case, the interval in which the K1 value, the K2 value, or the M value is larger than the threshold value may be classified and configured to correspond to each of the second to fourth LBT schemes.

In one embodiment, the threshold value served as a reference for determining an LBT scheme may be i) determined by a channel occupancy time value of a base station in a corresponding unlicensed band, ii) configured by the base station through cell-specific RRC signaling or UE-specific RRC signaling, or iii) configured by the base station through cell-specific RRC signaling or UE-specific RRC signaling irrespective of the channel occupancy time value.

In another embodiment, the threshold value served as a reference for determining an LBT scheme may be defined as a single threshold value for each UL transmission case described above, or be defined as different threshold values and configured by a base station through cell-specific RRC signaling or UE-specific RRC signaling. That is, an identical threshold value may be defined for the K1, the K2, and the M, or be configured by a base station through cell-specific RRC signaling or UE-specific RRC signaling. In another embodiment, separate threshold values may be defined for respective the K1, the K2, and the M, or be configured by a base station through cell-specific RRC signaling or UE-specific RRC signaling.

When the LBT for an unlicensed band according to a determined LBT scheme succeeds, the base station may receive an UL signal over the unlicensed band. For example, if the determined LBT scheme is the first LBT scheme, without the LBT for the unlicensed band being performed in a UE, the base station may receive an UL signal or channel over the unlicensed band.

If the determined LBT scheme is any one of the second to fourth LBT schemes, the UE may perform the LBT for the unlicensed band according to the determined LBT scheme. That is, if the determined LBT scheme is the second LBT scheme, the UE may perform the LBT without performing a random-back-off operation. As another example, if the determined LBT scheme is the third LBT scheme, when an LBT failure occurs, the UE may perform a random-back-off operation according to a predetermined fixed time interval. As another example, if the determined LBT scheme is the fourth LBT scheme, when an LBT failure occurs, the UE may perform a random-back-off operation according to a variable time interval. The base station may receive an UL signal or channel over the unlicensed band identified as not being occupied based on LBT performing.

According to the embodiments described above, it is possible to provide methods and apparatuses of performing LBT for wireless communications over an unlicensed band, by determining an LBT scheme to be performed for transmitting an UL signal in the unlicensed band, and enabling the UL signal to be transmitted in the unlicensed band based on the determined LBT scheme.

Hereinafter, embodiments for performing the LBT for wireless communications over an unlicensed band in the NR will be described in detail with reference to accompanying drawings.

As described above, in order for an node to transmit a radio signal over an unlicensed band, it is necessary to perform the LBT process for identifying whether the corresponding radio channel is occupied by other nodes.

Thus, in order for an NR-U cell in an unlicensed band configured by a NR base station to perform a PDSCH transmission for any UE, the base station is needed to perform the LBT for the unlicensed band. It is determined that a corresponding radio channel of the unlicensed band is not occupied by another based on the LBT performing, the base station may transmit a PDCCH and an associated PDSCH to the UE.

Likewise, in order for a UE to transmit an UL signal over an unlicensed band, it is necessary to perform the LBT for the unlicensed band prior to transmitting the UL signal.

In one embodiment, in NR, for HARQ ACK/NACK feedback timing in response to a PDSCH reception of a UE, a base station may configure through RRC signaling or indicate to the UE through DL assignment DCI. In this case, in the case of the NR-U cell for the unlicensed band described above, it may be not possible to perform a PUCCH transmission including HARQ ACK/NACK feedback information at a time indicated by a base station according to a result of the LBT performing by a UE. That is, when an LBT failure occurs according to a result of the LBT performing, in which a corresponding radio channel has been occupied by another node, the UE cannot transmit the HARQ ACK/NACK feedback information in response to a PDSCH reception at a time indicated by the base station. This may lead to HARQ performance of the NR-U cell being severely degraded.

Likewise, in one embodiment, in the case of transmitting UL data, that is, for a PUSCH transmission, it is necessary for a reception for UL grant DCI through a PDCCH from a base station to be preceded. As described above, when a UE fails in the LBT at a time indicated through the UL grant DCI, that is, at an indicated slot, the UE is unable to transmit a PUSCH at the indicated time.

In accordance with embodiments of the present disclosure, as described above, taking account of a situation in which an unlicensed band may be occupied by another node at an indicated time, provided are methods of transmitting an UL physical channel, i.e. a PUCCH or a PUSCH, of a UE for an NR-U cell. This is just one example; therefore, embodiments of the present disclosure are not limited thereto. For example, the embodiments of the present disclosure may be substantially equally applied to transmissions of all UL physical channels or physical signals, such as Physical Random Access Channel (PRACH), Sounding Reference Signal (SRS), or the like, in addition to the PUCCH and PUSCH.

Embodiment 1 Defining an LBT indication information region

In one embodiment, when allocating a PUCCH or PUSCH transmission resource for a UE, a base station may be defined to indicate whether the LBT is required to be performed in the UE at a time of transmitting the PUCCH or the PUSCH.

Hereinafter, LBT operations for a PUCCH transmission will be described in detail.

A UE may transmit UL Control Information (UCI) such as HARQ ACK/NACK feedback information or CQI/CSI reporting information to a base station through the PUCCH. In the NR, a time-domain resource and a frequency-domain resource that are PUCCH resources for transmitting HARQ feedback may be indicated by a base station through DL assignment DCI. In another example, PUCCH resources for transmitting HARQ feedback may be semi-statically configured through RRC signaling. In particular, in the case of the time-domain resource, a timing gap, a K1 value, between a PDSCH reception slot and an associated HARQ feedback information transmission slot may be transmitted to a UE through DL assignment DCI or RRC signaling.

Likewise, a PUCCH resource for CQI/CSI reporting may be assigned through RRC signaling and DL assignment DCI.

Figure 12:
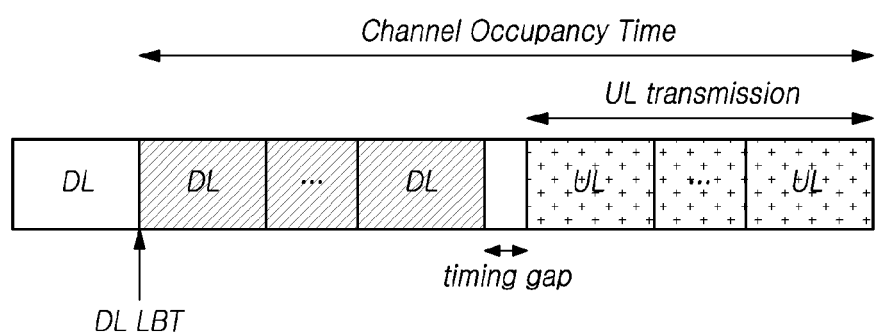
FIG. 12 is a diagram for explaining the determination of an LBT scheme for wireless communications over an unlicensed band in accordance with embodiments of the present disclosure.

Referring to FIG. 12, a situation is represented by hatching, in which LBT for a DL transmission (DL LBT) succeeds in a base station, and thereafter, the DL transmission is performed through an unlicensed band. In one embodiment, the DL transmission may be a transmission of a DL channel or signal indicating an UL transmission. For example, the DL transmission may include a PDSCH transmission and a PUCCH for an associated HARQ feedback, DCI requiring CQI/CSI reporting and a PUCCH for associated reporting, or DCI transmitting scheduling information on a PUSCH and associated PUSCH, etc. In this case, there occurs a timing gap between the DL transmission and the UL transmission.

For example, when a DL signal or channel associated with a DL transmission indicates a PUCCH transmission in an NR-U cell that is an unlicensed band, the UE is required to preferentially perform LBT for the PUCCH transmission according to regulations on unlicensed spectrum, and then, it is determined whether the PUCCH transmission at an indicated time according to a result of the LBT is available. If it is determined that a corresponding radio channel has been occupied by another node based on the result of the LBT, that is, when an LBT failure occurs, there is a possibility that the corresponding UE cannot perform the PUCCH transmission at the indicated time.

However, when a DL assignment DCI transmission slot including PUCCH resource assignment information and PUCCH transmission indication information or a PDSCH transmission slot according to DL assignment DCI and an associated PUCCH transmission slot are in a COT of a base station, there is a possibility that the UE can perform the PUCCH transmission without performing the LBT. This is because the corresponding unlicensed band has already been occupied by the base station for the DL transmission for the UE; therefore not have been occupied by another node. That is, there is a possibility that the UE can perform HARQ feedback transmission through the PUCCH without performing the LBT, according to the setting of a COT of the base station and a K1 value.

Likewise, when CSI/CQI reporting through a PUCCH is indicated through DL assignment DCI, in case a timing gap value between a slot on which the DL assignment DCI is transmitted and a slot on which a PUCCH transmission including associated CQI/CSI reporting information is performed is defined as M, there is a possibility that a UE can perform CSI/CQI reporting through the PUCCH without performing the LBT, according to a corresponding timing gap value, M, and a COT of a base station.

Further, in a similar way to that of the PUCCH, for a PUSCH transmission of a UE, a timing gap information, a K2 value, between UL grant DCI transmitted by a base station and a slot on which an associated PUSCH transmission is performed may be semi-statically configured through RRC signaling by the base station or dynamically configured through UL grant DCI. In even this case, when an UL grant DCI transmission slot including corresponding PUSCH transmission resource assignment information and an associated PUSCH transmission slot are in a COT of the base station, there is a possibility that a UE can perform the PUSCH transmission without performing the LBT.

In this regard, in accordance with embodiments of the present disclosure, the base station may determine an LBT scheme to be performed when a UE transmits a PUCCH or a PUSHC and indicate the determined LBT scheme to the UE. In one embodiment, the LBT scheme may be distinct from one another by at least one of whether the LBT is required to be performed, whether random-back-off is required to be performed, and a random-back-off time. Herein, a scheme of performing the LBT may be referred to as "LBT scheme"; however, embodiments of the present disclosure are not limited to such a specific term. For example, the scheme of performing the LBT may be variously referred to as an LBT category, or the like.

In one embodiment, the LBT scheme may include a first LBT scheme in which LBT is not performed, a second LBT scheme in which random-back-off is not performed while LBT is performed, a third LBT scheme in which a random-back-off time interval is fixed while random-back-off is performed, and a fourth LBT scheme in which a random-back-off time interval is variable while random-back-off is performed.

In one embodiment, a base station may be defined to directly indicate, to a UE, whether LBT is required to be performed for an UL transmission of the UE through L1 control signaling. Likewise, as illustrated in FIG. 13, an LBT indication information region may be defined to be included in an DL assignment DCI format for transmitting PDSCH scheduling control information.

For example, the LBT indication information may be indication information of 1 bit. In this case, when a UE transmits a PUCCH corresponding to the DL assignment DCI format, it may be defined to be determined whether the UE is required to perform the LBT according to values (0, 1) of the corresponding indication information bit. That is, in this case, the corresponding bit values may mean distinguishing the first LBT scheme from the remaining LBT schemes, among the LBT schemes described above.

In another embodiment, the LBT indication information may be indication information of 2 bits. In this case, when a UE transmits a PUCCH corresponding to the DL assignment DCI format, the UE may be defined to determine an LBT scheme for performing the LBT according to values (01, 10) of the corresponding indication information bit. That is, in this case, the respective bit values may mean distinguishing the first to fourth LBT schemes among the LBT schemes described above.

In this case, the PUCCH transmission corresponding to the DL assignment DCI format by the UE may be a PUCCH transmission for a HARQ feedback information transmission of the UE in response to a PDSCH reception of the UE based on the DL assignment DCI format. In another example, when CQI/CSI reporting is triggered by a DL assignment DCI format, a PUCCH transmission corresponding to the DL assignment DCI format by the UE may be an associated PUCCH transmission for the CQI/CSI reporting.

Figure 14:
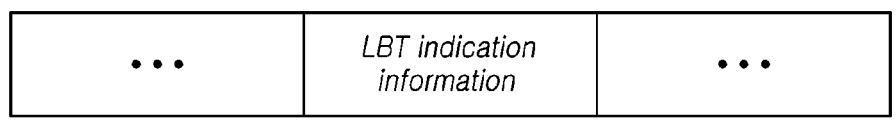

Likewise, as illustrated in FIG. 14, an LBT indication information region may be defined to be included in an UL grant DCI format for transmitting PUSCH scheduling control information.

For example, the LBT indication information may be indication information of 1 bit. In this case, when a UE transmits a PUSCH corresponding to the UL grant DCI format, it may be defined to be determined whether the UE is required to perform the LBT according to values (0, 1) of the corresponding indication information bit. That is, in this case, the corresponding bit values may mean distinguishing the first LBT scheme from the remaining LBT schemes, among the LBT schemes described above.

In another embodiment, the LBT indication information may be indication information of 2 bits. In this case, when a UE transmits a PUSCH corresponding to the UL grant DCI format, the UE may be defined to determine an LBT scheme for performing the LBT according to values (01, 10) of the corresponding indication information bit. That is, in this case, the respective bit values may mean distinguishing the first to fourth LBT schemes among the LBT schemes described above.

In this case, the PUSCH transmission corresponding to the DL grant DCI format by the UE may be a PUSCH transmission for an UL data transmission of the UE, or a PDSCH transmission for a UCI transmission of the UE.

Additionally, with respect to the LBT indication information region, all examples or embodiments indicating the identical functionality irrespective of the term may be included within the scope of the present disclosure. For example, the indication information region may be a COT availability indication information region, or an information region in which a base station indicates whether a COT obtained through LBT is available at an associated PUCCH or PUSCH transmission time (slot) of a UE, and according to this, as described above, when the COT is available, the UE may perform a PUCCH or PUSCH transmission without performing the LBT.

In another embodiment, whether a UE is required to perform LBT may be defined to be implicitly determined according to a setting value of another information region defined at a DL assignment DCI format or an UL grant DCI format.

In this case, in one embodiment, when LBT indication information is defined to be transmitted through a DL assignment DCI format or an UL grant DCI format, a base station may be defined to configure whether a corresponding LBT indication information region is included in the DL assignment DCI format or the UL grant DCI format for a UE and transmit through higher layer signaling. In another embodiment, whether an LBT indication information is included in a DL assignment DCI format or an UL grant DCI format may be defined to be determined according to whether a cell type in which a UE performs an UL transmission corresponding to the DCI format is an NR-U cell, a licensed band NR cell, or the like.

Embodiment 2 Determining an LBT scheme by a COT value of a base station and a timing gap between a DL reception and an associated UL transmission In another embodiment of defining whether LBT is required to be performed or an LBT scheme for an UL transmission of a UE, as shown in FIG. 12, whether the LBT is required to be performed may be defined to be determined by a timing gap value between a DL transmission to which the UL transmission is indicated and the associated UL transmission.

That is, when a PUCCH transmission is performed for HARQ feedback in response to a PDSCH reception, a timing gap of FIG. 12 becomes K1 as described above. In this case, whether the LBT is required to be performed or an LBT scheme for a PUCCH transmission over an unlicensed band may be defined to be determined by the K1 value.

In another embodiment, when CQI/CSI reporting is triggered by DL assignment DCI, a timing gap between the DL assignment DCI of FIG. 12 and an associated PUCCH transmission becomes M as described above. In this case, whether the LBT is required to be performed or an LBT scheme for a PUCCH transmission for CQI/CSI reporting over an unlicensed band may be defined to be determined by the M value.

In another example, in the case of an UL grant DCI format and an associated PUSCH transmission, a timing gap between the UL grant DCI of FIG. 12 and the associated PUSCH transmission becomes K2 as described above. In this case, whether the LBT is required to be performed or an LBT scheme for a PUSCH transmission over an unlicensed band may be defined to be determined by the K2 value.

In one embodiment, when the K1 value, the K2 value, or the M value is smaller than a threshold value, a corresponding UE may be defined to enable an indicated PUCCH or PUSCH transmission without performing the LBT. In another embodiment, when the K1 value, the K2 value, or the M value is larger than the threshold value, the UE may be defined to enable a corresponding PUCCH or PUSCH transmission after performing the LBT.

In one embodiment, the threshold value may be i) determined by a COT value in a corresponding NR-U, ii) configured by a base station through cell-specific RRC signaling or UE-specific RRC signaling, or iii) configured by the base station through cell-specific RRC signaling or UE-specific RRC signaling irrespective of the COT.

Additionally, the threshold value may be defined as a single threshold value for each UL transmission case or be defined as different threshold values and configured by a base station through cell-specific RRC signaling or UE-specific RRC signaling. That is, an identical threshold value may be defined for the K1, the K2, and the M, or be configured by a base station through cell-specific RRC signaling or UE-specific RRC signaling. In another example, separate threshold values may be defined for respective the K1, the K2, and the M, or be configured by a base station through cell-specific RRC signaling or UE-specific RRC signaling.

Additionally, hereinbefore, whether the LBT is required to be performed or an LBT scheme has been discussed based on an assumption that a PUSCH or PUCCH is transmitted. However, the foregoing description may be substantially equally applicable even when a PRACH or SRS transmission is performed.

For example, even when a PRACH transmission of a UE is triggered by a system information block (SIB) or a PDCCH, LBT indication information may be directly transmitted through a corresponding SIB or PDCCH message, or the UE may be defined to determine whether the LBT is required to be performed, or an LBT scheme, based on a timing gap between a SIB or PDCCH reception slot and an associated PRACH transmission slot. Likewise, even when an SRS transmission is triggered through a PDCCH, the LBT indication information may be directly transmitted through the PDCCH, or the UE may be configured to determine whether to perform the LBT based on a timing gap between a PDCCH reception slot and an associated SRS transmission slot.

According to the embodiments described above, it is possible to provide methods and apparatuses of performing LBT for wireless communications over an unlicensed band, by determining an LBT scheme to be performed for transmitting an UL signal in the unlicensed band, and enabling the UL signal to be transmitted in the unlicensed band based on the determined LBT scheme.

Hereinafter, structural configurations of a UE and a base station capable of performing a part or all of the embodiments described with reference to FIGS. 1 to 14 will be discussed with reference to the drawings.

Figure 15:
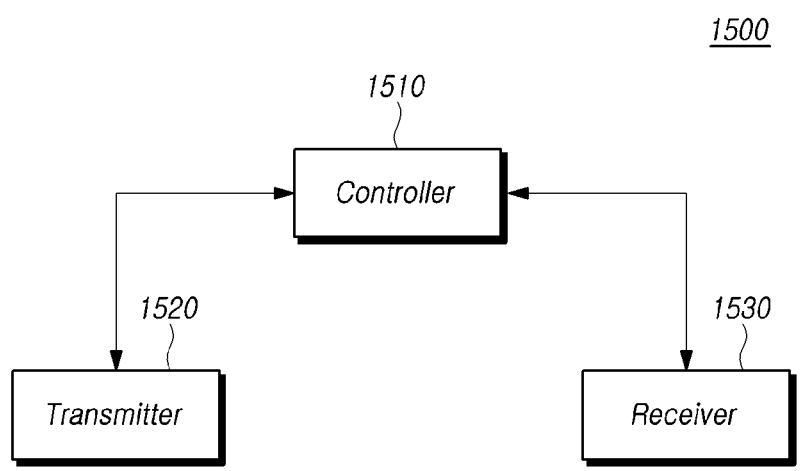
FIG. 15 is a block diagram illustrating a UE according to embodiments of the present disclosure.

FIG. 15 is a block diagram illustrating a UE 1500 according to embodiments of the present disclosure.

Referring to FIG. 15, the UE 1500 includes a controller 1510, a transmitter 1520, and a receiver 1530.

The controller 1510 controls overall operations of the UE 1500 needed for methods of performing LBT for wireless communications over an unlicensed band needed for performing the embodiments of the present disclosure described above. The transmitter 1520 transmits UL control information, data, message, etc. through a corresponding channel to a base station. The receiver 1530 receives DL control information, data, message, etc. through a corresponding channel from a base station.

In one embodiment, the controller 1510 may determine an LBT scheme for transmitting an UL signal in an unlicensed band among a plurality of LBT schemes being distinct from one another by at least one of whether the LBT is required to be performed, whether random-back-off is required to be performed, and a random-back-off time.

In one embodiment, the receiver 1530 may receive a DL channel or signal related to the transmission of an UL signal or an UL channel in the unlicensed band from a base station. For example, the DL channel or signal related to the transmission of the UL signal or the UL channel may include a PDSCH to which the transmission of a PUCCH for HARQ feedback is indicated, DL assignment DCI to which the transmission of a PUCCH for CQI/CSI reporting is indicated, or UL grant DCI to which the transmission of a PUSCH is indicated, and the like.

In one embodiment, the controller 1510 may determine an LBT scheme when an UL signal or channel is transmitted in a channel occupancy time of a base station for an unlicensed band. For example, in a channel occupancy time of a base station, a suitable LBT scheme may be determined according to a timing gap between an DL signal or channel and an associated UL signal or channel, whether the transmission of an DL signal or channel and the transmission of an associated UL signal or channel is performed in an identical channel occupancy time, or the like.

In one embodiment, when a transmission resource for an UL signal or channel for a UE is assigned, the receiver 1530 may receive information on an LBT scheme to be performed from a base station at a time of transmitting the UL signal or channel.

In one embodiment, the receiver 1530 may directly receive, from a base station, an indication on whether LBT is required to be performed or an LBT scheme for an UL transmission of the UE through L1 control signaling. Specifically, an LBT indication information region for indicating whether the LBT is required to be performed or the LBT scheme may be included in a DL assignment DCI format for transmitting PDSCH scheduling control information.

For example, the LBT indication information may be indication information of 1 bit. In this case, when a UE transmits a PUCCH corresponding to the DL assignment DCI format, it may be determined whether the UE is required to perform the LBT according to values (0, 1) of the LBT indication information bit.

In another embodiment, the LBT indication information may be indication information of 2 bits. In this case, the first to fourth LBT schemes described above may be configured to correspond to respective values (00, 01, 10, 11) of the LBT indication information bit. When a UE transmits a PUCCH corresponding to a DL assignment DCI format, an LBT scheme to be used for performing the LBT by the UE may be determined according to values of the LBT indication information bit.

In this case, the PUCCH transmission corresponding to the DL assignment DCI format by the UE may be a PUCCH transmission for a HARQ feedback information transmission of the UE in response to a PDSCH reception of the UE based on the DL assignment DCI format. For example, when CQI/CSI reporting is triggered by a DL assignment DCI format, a PUCCH transmission corresponding to the DL assignment DCI format by the UE may be an associated PUCCH transmission for the CQI/CSI reporting.

Likewise, an LBT indication information region may be included in an UL grant DCI format for transmitting PUSCH scheduling control information.

In an embodiment, the LBT indication information may be indication information of 1 bit. In this case, when a UE transmits a PUSCH corresponding to the UL grant DCI format, it may be determined whether the UE is required to perform the LBT according to values (0, 1) of the LBT indication information bit.

In another embodiment, the LBT indication information may be indication information of 2 bits. In this case, the first to fourth LBT schemes described above may be configured to correspond to respective values (00, 01, 10, 11) of the LBT indication information bit. When a UE transmits a PUSCH corresponding to an UL grant DCI format, an LBT scheme to be used for performing the LBT by the UE may be determined according to values of the LBT indication information bit.

In this case, the PUSCH transmission corresponding to the DL grant DCI format by the UE may be a PUSCH transmission for an UL data transmission of the UE, or a PDSCH transmission for a UCI transmission of the UE.

Further, in one embodiment, when LBT indication information is transmitted through a DL assignment DCI format or an UL grant DCI format, the receiver 1530 may receive, through higher layer signaling, whether a corresponding LBT indication information region is included in the DL assignment DCI format or the UL grant DCI format for a UE configured by a base station. In another embodiment, whether an LBT indication information is included in a DL assignment DCI format or an UL grant DCI format may be determined according to whether a cell type in which a UE performs an UL transmission corresponding to the DCI format is an NR-U cell, a licensed band NR cell, or the like.

In one embodiment, the controller 1510 may determine an LBT scheme for an unlicensed band based on a channel occupancy time value of a base station and a timing gap between a DL reception and an associated UL transmission.

For example, a time-domain resource and a frequency-domain resource that are PUCCH resources for transmitting HARQ feedback may be indicated by a base station through DL assignment DCI. As another example, PUCCH resources for transmitting HARQ feedback may be semi-statically configured through RRC signaling. In particular, in the case of the time-domain resource, a timing gap, a K1 value, between a PDSCH reception slot and an associated HARQ feedback information transmission slot may be transmitted to the UE through DL assignment DCI or RRC signaling.

Further, likewise, a PUCCH resource for CQI/CSI reporting may be assigned through RRC signaling and DL assignment DCI. When CSI/CQI reporting through a PUCCH is indicated through DL assignment DCI, a timing gap value, an M value, between a slot on which the DL assignment DCI is transmitted and a slot on which a PUCCH transmission including associated CQI/CSI reporting information is performed may be transmitted to the UE through RRC signaling and DL assignment DCI.

Further, in a similar way to that of the PUCCH, for a PUSCH transmission of the UE, a timing gap value, a K2 value, between UL grant DCI transmitted by a base station and a slot on which an associated PUSCH transmission is performed may be semi-statically configured through RRC signaling by the base station or dynamically configured through UL grant DCI.

That is, when a PUCCH transmission is performed for HARQ feedback in response to a PDSCH reception, a timing gap between the PDSCH reception and the PUCCH transmission becomes K1 as described above. In this case, the controller 1510 may determine, by the K1 value, whether the LBT is required to be performed, or an LBT scheme, for a PUCCH transmission over an unlicensed band.

As another example, when CQI/CSI reporting is triggered by DL assignment DCI, a timing gap between the DL assignment DCI and an associated PUCCH transmission becomes M as described above. In this case, the controller 1510 may determine, by the M value, whether the LBT is required to be performed or an LBT scheme for CQI/CSI reporting over an unlicensed band.

As another example, in the case of an UL grant DCI format and an associated PUSCH transmission, a timing gap between the UL grant DCI and the associated PUSCH transmission becomes K2 as described above. In this case, the controller 1510 may determine, by the K2 value, whether the LBT is required to be performed or an LBT scheme for a PUSCH transmission over an unlicensed band.

In one embodiment, when the K1 value, the K2 value, or the M value is smaller than a threshold value, a corresponding UE may be configured to enable an indicated PUCCH or PUSCH transmission without performing the LBT. In another embodiment, when the K1 value, the K2 value, or the M value is larger than the threshold value, the UE may be configured to enable a corresponding PUCCH or PUSCH transmission after performing the LBT. In this case, the interval in which the K1 value, the K2 value, or the M value is larger than the threshold value may be classified and configured to correspond to each of the second to fourth LBT schemes.

In one embodiment, the threshold value served as a reference for determining an LBT scheme may be i) determined by a channel occupancy time value of a base station in a corresponding unlicensed band, ii) configured by the base station through cell-specific RRC signaling or UE-specific RRC signaling, or iii) configured by the base station through cell-specific RRC signaling or UE-specific RRC signaling irrespective of the channel occupancy time value.

In another embodiment, the threshold value served as a reference for determining an LBT scheme may be defined as a single threshold value for each UL transmission case described above or be defined as different threshold values and configured by a base station through cell-specific RRC signaling or UE-specific RRC signaling. That is, an identical threshold value may be defined for the K1, the K2, and the M, or be configured by a base station through cell-specific RRC signaling or UE-specific RRC signaling. In another embodiment, separate threshold values may be defined for respective the K1, the K2, and the M, or be configured by a base station through cell-specific RRC signaling or UE-specific RRC signaling.

Hereinbefore, whether the LBT is required to be performed or an LBT scheme has been discussed based on an assumption that a PUSCH or PUCCH is transmitted. However, in another embodiment, the foregoing description may be substantially equally applicable even when a PRACH or SRS transmission is performed.

The controller 1510 may perform the LBT for the unlicensed band to which the transmission of the UL signal or channel is indicated according to the determined LBT scheme. For example, if the determined LBT scheme is the first LBT scheme, the transmitter 1520 may perform the transmission of the indicated UL signal or channel without performing the LBT for the unlicensed band.

If the determined LBT scheme is any one of the second to fourth LBT schemes, the controller 1510 may perform the LBT for the unlicensed band according to the determined LBT scheme. For example, if the determined LBT scheme is the second LBT scheme, the controller 1510 may perform the LBT without performing a random-back-off operation. As another example, if the determined LBT scheme is the third LBT scheme, when an LBT failure occurs, the controller 1510 may perform a random-back-off operation according to a predetermined fixed time interval. As another example, if the determined LBT scheme is the fourth LBT scheme, when an LBT failure occurs, the controller 1510 may perform a random-back-off operation according to a variable time interval. When the unlicensed band is identified as not being occupied based on LBT performing, the transmitter 1520 may perform the transmission of the indicated UL signal or channel.

According to the embodiments described above, it is possible to provide methods and apparatuses of performing LBT for wireless communications over an unlicensed band, by determining an LBT scheme to be performed for transmitting an UL signal in the unlicensed band, and enabling the UL signal to be transmitted in the unlicensed band based on the determined LBT scheme.

Figure 16:
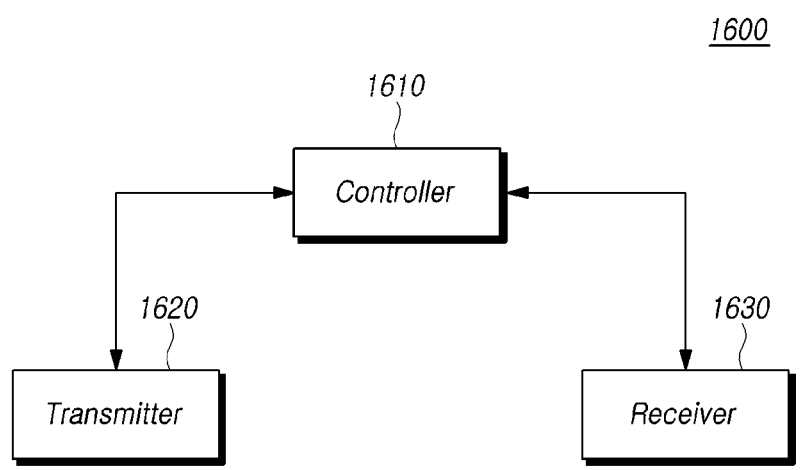
FIG. 16 is a block diagram illustrating a base station in accordance with embodiments of the present disclosure.

FIG. 16 is a block diagram illustrating a base station 1600 according to embodiments of the present disclosure.

Referring to FIG. 16, the base station 1600 includes a controller 1610, a transmitter 1620, and a receiver 1630.

The controller 1610 controls overall operations of the base station 1600 needed for methods of performing LBT for wireless communications over an unlicensed band needed for performing the embodiments of the present disclosure described above. The transmitter 1620 and the receiver 1630 transmit, to a UE and receive from the UE, signals, messages, and data necessary for performing embodiments of the present disclosure.

The transmitter 1620 may transmit a DL signal indicating the transmission of an UL signal over the unlicensed band.

In one embodiment, the transmitter 1620 may transmit a DL channel or signal related to transmission of an UL signal or an UL channel in an unlicensed band to a UE. For example, the DL channel or signal related to the transmission of the UL signal or the UL channel may include a PDSCH to which the transmission of a PUCCH for HARQ feedback is indicated, DL assignment DCI to which the transmission of a PUCCH for CQI/CSI reporting is indicated, or UL grant DCI to which the transmission of a PUSCH is indicated, and the like.

Referring to FIG. 1630, the receiver 1630 may receive an UL signal over an unlicensed band based on an LBT scheme determined for transmitting the UL signal in the unlicensed band among a plurality of LBT schemes that is used for transmitting the UL signal over the unlicensed band and that is distinct from one another by at least one of whether the LBT is required to be performed, whether random-back-off is required to be performed, and a random-back-off time.

In one embodiment, a UE may determine an LBT scheme when an UL signal or channel is transmitted in a channel occupancy time of the base station for an unlicensed band. For example, in a channel occupancy time of the base station, a suitable LBT scheme may be determined according to a timing gap between an DL signal or channel and an associated UL signal or channel, whether the transmission of an DL signal or channel and the transmission of an associated UL signal or channel is performed in an identical channel occupancy time, or the like.

In one embodiment, when a transmission resource for an UL signal or channel for a UE is assigned, the transmitter 1620 may transmit information on an LBT scheme to be performed to the UE at a time of transmitting the UL signal or channel.

In one embodiment, the transmitter 1620 may directly indicate, to a UE, whether LBT is required to be performed or an LBT scheme for an UL transmission of the UE through L1 control signaling. Specifically, an LBT indication information region for indicating whether the LBT is required to be performed or the LBT scheme may be included in a DL assignment DCI format for transmitting PDSCH scheduling control information.

In this case, the PUCCH transmission corresponding to the DL assignment DCI format by the UE may be a PUCCH transmission for a HARQ feedback information transmission of the UE in response to a PDSCH reception of the UE based on the DL assignment DCI format. In another embodiment, when CQI/CSI reporting is triggered by a DL assignment DCI format, a PUCCH transmission corresponding to the DL assignment DCI format by the UE may be an associated PUCCH transmission for the CQI/CSI reporting.

Likewise, an LBT indication information region may be included in an UL grant DCI format for transmitting PUSCH scheduling control information.

In this case, the PUSCH transmission corresponding to the DL grant DCI format by the UE may be a PUSCH transmission for an UL data transmission of the UE, or a PDSCH transmission for a UCI transmission of the UE.

Further, in one embodiment, when LBT indication information is transmitted through a DL assignment DCI format or an UL grant DCI format, the transmitter 1620 may configure whether a corresponding LBT indication information region is included in the DL assignment DCI format or the UL grant DCI format for a UE and transmit through higher layer signaling. In another embodiment, whether an LBT indication information is included in a DL assignment DCI format or an UL grant DCI format may be determined according to whether a cell type in which a UE performs an UL transmission corresponding to the DCI format is an NR-U cell, a licensed band NR cell, or the like.

In one embodiment, a UE may determine an LBT scheme for an unlicensed band based on a channel occupancy time value of the base station and a timing gap between a DL reception and an associated UL transmission.

For example, the transmitter 1620 may transmit a timing gap, a K1 value, between a PDSCH reception slot and an associated HARQ feedback information transmission slot to the UE through DL assignment DCI or RRC signaling. As another example, the transmitter 1620 may transmit, to the UE, a timing gap value, an M value, between a slot on which the DL assignment DCI is transmitted and a slot on which a PUCCH transmission including associated CQI/CSI reporting information is performed through RRC signaling and DL assignment DCI. As further another example, in a similar way to that of the PUCCH, for a PUSCH transmission of the UE, the transmitter 1620 may semi-statically configure a timing gap value, a K2 value, between UL grant DCI and a slot on which an associated PUSCH transmission is performed through RRC signaling or dynamically configure it through UL grant DCI.

That is, when a PUCCH transmission is performed for HARQ feedback in response to a PDSCH reception, a timing gap between the PDSCH reception and the PUCCH transmission becomes K1 as described above. In this case, a UE may determine, by the K1 value, whether the LBT is required to be performed or an LBT scheme for a PUCCH transmission over an unlicensed band.

In another embodiment, when CQI/CSI reporting is triggered by DL assignment DCI, a timing gap between the DL assignment DCI and an associated PUCCH transmission becomes M as described above. In this case, the UE may determine, by the M value, whether the LBT is required to be performed or an LBT scheme for CQI/CSI reporting over an unlicensed band.

In another embodiment, in the case of an UL grant DCI format and an associated PUSCH transmission, a timing gap between the UL grant DCI and the associated PUSCH transmission becomes K2 as described above. In this case, a UE may determine, by the K2 value, whether the LBT is required to be performed or an LBT scheme for a PUCCH transmission over an unlicensed band.

In one embodiment, when the K1 value, the K2 value, or the M value is smaller than a threshold value, a corresponding UE may be configured to enable an indicated PUCCH or PUSCH transmission without performing the LBT. In another embodiment, when the K1 value, the K2 value, or the M value is larger than the threshold value, the UE may be configured to enable a corresponding PUCCH or PUSCH transmission after performing the LBT. In this case, the interval in which the K1 value, the K2 value, or the M value is larger than the threshold value may be classified and configured to correspond to each of the second to fourth LBT schemes.

In one embodiment, the threshold value served as a reference for determining an LBT scheme may be i) determined by a channel occupancy time value of a base station in a corresponding unlicensed band, ii) configured by the base station through cell-specific RRC signaling or UE-specific RRC signaling, or iii) configured by the base station through cell-specific RRC signaling or UE-specific RRC signaling irrespective of the channel occupancy time value.

In another embodiment, the threshold value served as a reference for determining an LBT scheme may be defined as a single threshold value for each UL transmission case described above or be defined as different threshold values and configured by the base station through cell-specific RRC signaling or UE-specific RRC signaling. That is, an identical threshold value may be defined for the K1, the K2, and the M, or be configured by the base station through cell-specific RRC signaling or UE-specific RRC signaling. In another embodiment, separate threshold values may be defined for respective the K1, the K2, and the M, or be configured by the base station through cell-specific RRC signaling or UE-specific RRC signaling.

Hereinbefore, whether the LBT is required to be performed or an LBT scheme has been discussed based on an assumption that a PUSCH or PUCCH is transmitted. However, in another embodiment, the foregoing description may be substantially equally applicable even when a PRACH or SRS transmission is performed.

A UE may perform the LBT for an unlicensed band to which the transmission of an UL signal or channel is indicated according to a determined LBT scheme. For example, if the determined LBT scheme is the first LBT scheme, the UE is not required to perform the LBT for the unlicensed band, and the receiver 1630 may receive the indicated UL signal or channel.

If the determined LBT scheme is any one of the second to fourth LBT schemes, the UE may perform the LBT for the unlicensed band according to the determined LBT scheme. For example, if the determined LBT scheme is the second LBT scheme, the UE may perform the LBT without performing a random-back-off operation. As another example, if the determined LBT scheme is the third LBT scheme, when an LBT failure occurs, the UE may perform a random-back-off operation according to a predetermined fixed time interval. As another example, if the determined LBT scheme is the fourth LBT scheme, when an LBT failure occurs, the UE may perform a random-back-off operation according to a variable time interval. When the unlicensed band is identified as not being occupied based on LBT performing, the receiver 1630 may receive the indicated UL signal or channel.

According to the embodiments described above, it is possible to provide methods and apparatuses of performing LBT for wireless communications over an unlicensed band, by determining an LBT scheme to be performed for transmitting an UL signal in the unlicensed band, and enabling the UL signal to be transmitted in the unlicensed band based on the determined LBT scheme.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method of a user equipment (UE) for performing Listen Before Talk (LBT) for wireless communications over an unlicensed band, the method comprising:
   determining an LBT scheme from a plurality of LBT schemes for transmitting an uplink (UL) signal over the unlicensed band;
   performing the LBT according to the determined LBT scheme; and
   transmitting the UL signal over the unlicensed band after performing the LBT,
   wherein the LBT scheme is determined in association with timing gap information from a plurality of timing gap information between a transmission of a downlink (DL) signal of a base station and a transmission of the UL signal of the UE, and
   wherein each of the plurality of timing gap information corresponds to each of the plurality of LBT schemes to perform the LBT.

2. The method according to claim 1, wherein the UL signal is transmitted over the unlicensed band in a channel occupancy time being shared for the transmission of the DL signal of the base station and the transmission of the UL signal of the UE.

3. The method according to claim 1, wherein the LBT scheme is determined based on LBT indication information received from the base station.

4. A user equipment (UE) performing Listen Before Talk (LBT) for wireless communications over an unlicensed band, the UE comprising:
   a controller configured to determine an LBT scheme from a plurality of LBT schemes for transmitting an uplink (UL) signal over the unlicensed band, and perform the LBT according to the determined LBT scheme; and a transmitter configured to transmit the UL signal over the unlicensed band after performing the LBT, wherein the LBT scheme is determined in association with timing gap information from a plurality of timing gap information between a transmission of a downlink (DL) signal of a base station and a transmission of the UL signal of the UE, and wherein each of the plurality of timing gap information corresponds to each of the plurality of LBT schemes to perform the LBT.

5. The UE according to claim 4, wherein the UL signal is transmitted over the unlicensed band in a channel occupancy time being shared for the transmission of the DL signal of the base station and the transmission of the UL signal of the UE.

6. The UE according to claim 4, wherein the LBT scheme is determined based on LBT indication information received from the base station.

* * * * *